Patented Aug. 11, 1936

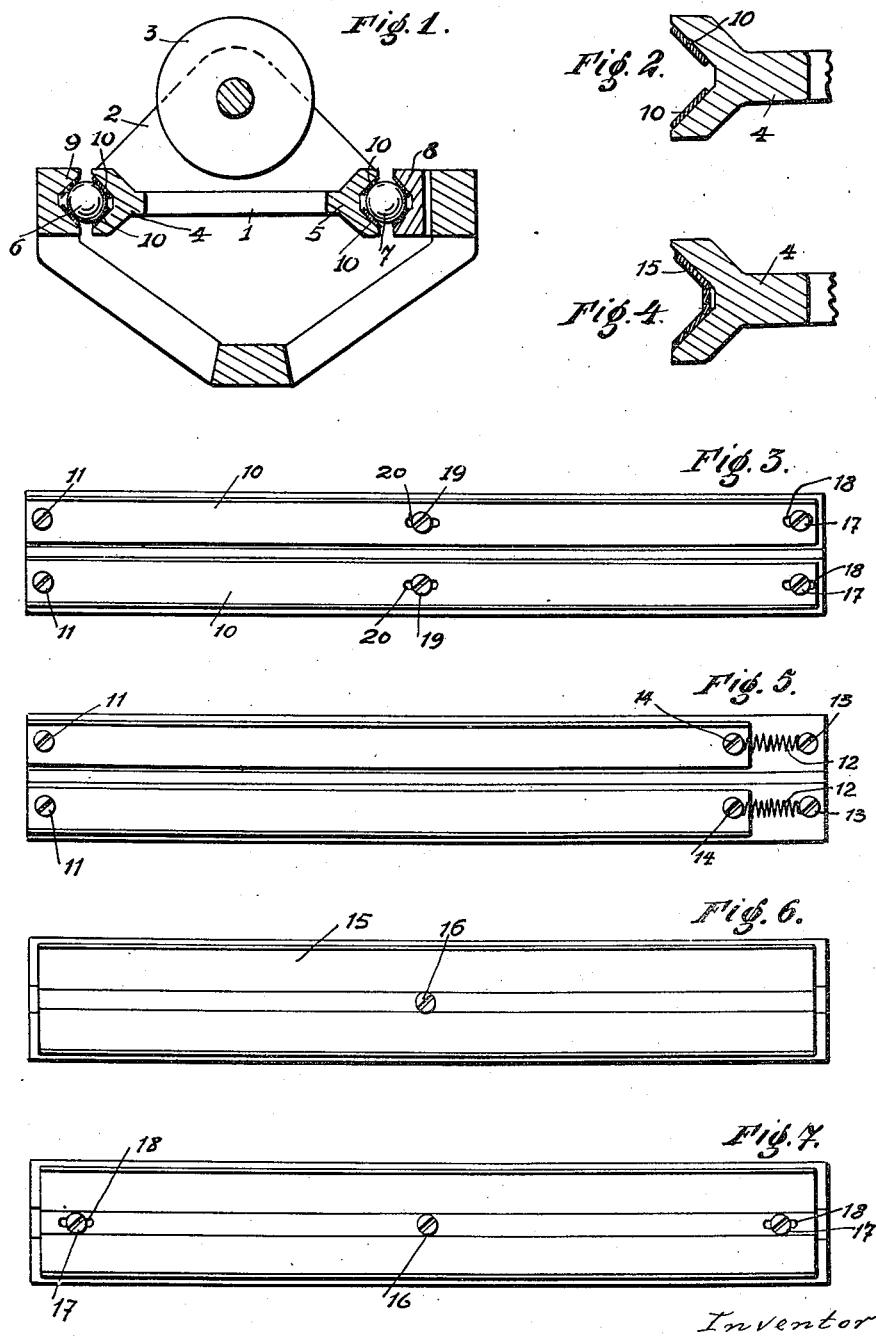

2,050,960

UNITED STATES PATENT OFFICE 2,050,960

SLIDING SURFACE OR GUIDE FOR ROLLERS OR BALLS IN MACHINE PARTS

Camillo Olivetti, Ivrea, Italy

Application July 25, 1935, Serial No. 33,186
In Italy October 18, 1934

2 Claims. (Cl. 308—6)

The present invention relates to an improved sliding surface or guide for rollers or balls in machine parts of light metal or of insufficient resistivity.

Many machines include parts which are slidably arranged on longitudinal guides and have to carry out movements with considerable velocity. As a typical example of this mention may be made of typewriter carriages which have to move step by step but with great rapidity in order to follow the successive strokes of the typist's fingers on the keys of the typewriter. It is obvious therefore that, in order to attain the desired rapidity of movement with the minimum motive force and the smallest shocks between the parts, the carriage and movable parts in general should be made as light as possible by employing in their construction light alloys of aluminum, magnesium and the like. The use of these materials is however rendered difficult by the fact that they are very soft and of low mechanical resistivity, so that it is not easy to construct from them sliding surfaces that are both accurate and smooth and still less are they capable of resisting the concentrated pressure exerted by the ball- or roller-bearings which, as is the case with typewriter carriages, are inserted between the carriage and its guides in the frame, with a view to increasing its slidability.

An important object of the present invention is therefore to enable movable machine parts, such as the carriages of typewriters or calculating machines, to be constructed of light metal and at the same time to ensure that the rollers or balls are guided under the best possible conditions.

A further object is to distribute the pressures exerted by the rollers or balls on the light metal machine parts, thereby preventing deformation thereof.

A further object is to provide smooth and hard contact surfaces for the rollers or balls on the light metal machine parts.

A still further object is to provide means that allow for the difference in the thermal expansion of a light metal machine part and of separate means attached thereto for the attainment of the foregoing objects.

Although specific mention is made above only of machine parts consisting of light metal, it is obvious that the present invention is also applicable to machine parts of other materials for instance to parts made of alloys that are fusible under pressure and even to non-metallic materials.

Other objects and advantages of the present invention will become apparent during the course of the following description.

Several embodiments of the present invention will now be described by way of example with reference to the accompanying drawing in which Fig. 1 is a diagrammatic cross section through a typewriter carriage and part of the supporting frame, Fig. 2 is a cross section of one of the guides on the carriage showing one form of the protective means according to the present invention, Fig. 3 is an elevation of the guide shown in Fig. 2, Fig. 4 is a cross section corresponding to Fig. 2 of a guide fitted with an alternative form of protective means, Fig. 5 is an elevation of a guide showing an alternative method of mounting the protective means, Fig. 6 is an elevation of the guide and protective means shown in Fig. 4, and Fig. 7 is an elevation showing an arrangement similar to that shown in Fig. 6, but having additional means for attaching the protective means to the guide and at the same time allowing for difference in the thermal expansion of the guide and of the protective means.

Referring to Fig. 1, the frame 1 of the carriage carries the platen 3 by means of the side members 2. In guides 4 and 5 engage balls 6, 7 which are inserted between the movable carriage and its supporting guides 8 and 9. Since these latter members are fixedly mounted their weight has no signification and they may therefore consist of steel, cast iron or any other suitable material at will. Obviously however, in cases where it is desired to attain a very light total weight, these may also be made of light metal and in that case they are constructed according to the present invention.

The movable frame 1 is made of light metal and consequently the guides 4 and 5 cannot withstand the concentrated pressure of the balls 6 and 7 without the protection of strips 10 of hard metal which provide the ball race surfaces and distribute the pressure.

In Figs. 2 and 3 is illustrated one method of securing the steel protective strips to the light metal guide. The guide 4 is provided with a suitable groove in order to hold the balls in position and the strips which provide the ball race surfaces are securely fixed at one of their ends by screws 11 to one end of the guide 4, while their other ends are provided with slots 18 in which engage screws 17 which prevent the removal of the strip from the guide, but permit the strips to move longitudinally in order to compensate for the differences in their longitudinal displacements and those of the guide 4, which relative displacements are due to temperature variations and to the difference in the coefficients of expansion of the metals of which the guide 4 and strips 10 are made. If the guide 4 is very long the strips may be secured in the manner described not only at the end, but also at a point in the middle by means of screws 19 which engage in slots 20. If the strip is too thin to be capable of remaining in place without distorsion it may be secured in the manner illustrated in Fig. 5. Here the strips which form the sliding surfaces are firmly secured at one end to the guide 4 by screws 11, and are held tightly stretched by strong springs 12 at the other end, one end of each spring being secured to the guide at 13 and the other end to the strips at 14. As can easily be understood the springs as well as the strips should be kept under tension so as to allow for differences in the thermal expansions of the strips and guide. This method of attachment is most suitable when the lengths of the strips are relatively great, since, the position of the metal strip being accurately determined, a good supporting surface for the balls is ensured and free thermal expansions are not prevented.

In the arrangement illustrated in Figs. 6 and 7 the sliding surfaces, instead of being formed on two separate strips, are provided by a single steel strip 15 of V cross section, which accurately fits the contour of the guide 4. The stiffness of this angle strip allows of its being attached only at its mid point at 16, so that the side portions are capable of free thermal expansion. In the case of long strips, in which the necessary thickness of material cannot be obtained or is not desired, the strip may be secured in the middle as in the constructional example described with reference to Fig. 6 and attached at both ends by means of screws 17 (Fig. 7) fitted in the light metal frame, so that their shanks engage in slots 18 in the strip in the same manner as described with reference to Fig. 3. Thus the strip 15 can expand freely relatively to the guide 4, but the method of attachment described (Fig. 7) prevents it from being detached from the guide 4. Naturally the ends of the angle strips 15 (Figs. 6 and 7) may be attached by springs and held under tension, as described with reference to Fig. 5 when the carriage is very long.

As has already been stated these methods of attachment of members of steel or other hard material to a part beneath consisting of light metal, are only described by way of example, since other methods which fulfill the same end, namely to allow of free thermal expansion of both parts, could easily be provided, without exceeding the scope of the present invention as defined in the appended claims.

What I claim is:

1. In a machine, a frame, a slidable carriage of light metal mounted for movement relative to said frame, inwardly and oppositely facing guide grooves provided on said frame, outwardly and oppositely facing guide grooves in said slidable carriage, bearing members arranged between said guide grooves and co-operating therewith to support and guide said slidable carriage relatively to the frame, strips of hard metal slotted longitudinally near at least one of their ends and fixed to the walls of the guide grooves in the carriage at parts remote from their slotted portions, shank members passing through the slots in said strips and secured to the walls of the guide grooves in the carriage, and retaining heads on said shank members for holding the strips against the walls of the guide grooves while permitting longitudinal movement of the slotted portions of said strips relatively to said shank members.

2. In a machine, a frame of light metal, a slidable carriage of light metal mounted for sliding movements relative to said frame, inwardly and oppositely facing longitudinal guide grooves in said frame, outwardly and oppositely facing longitudinal guide grooves in said slidable carriage, ball bearing members located between said guide grooves and co-operating therewith to support and guide said slidable carriage relatively to the frame, strip means of hard metal between said guide grooves and said ball bearing members, fixing means clamping the middle part of each strip against the middle part of its guide groove, and means serving to hold the extremities of the several strips against the corresponding extremities of their guide grooves, with freedom for longitudinal displacement of the extremities of the strips relative to those of the guide grooves due to temperature fluctuations.

CAMILLO OLIVETTI.